June 26, 1934.   E. L. BOWEN   1,964,105
LOAD EQUALIZING MEANS FOR DUAL TIRED WHEELS
Filed July 16, 1932   2 Sheets-Sheet 2
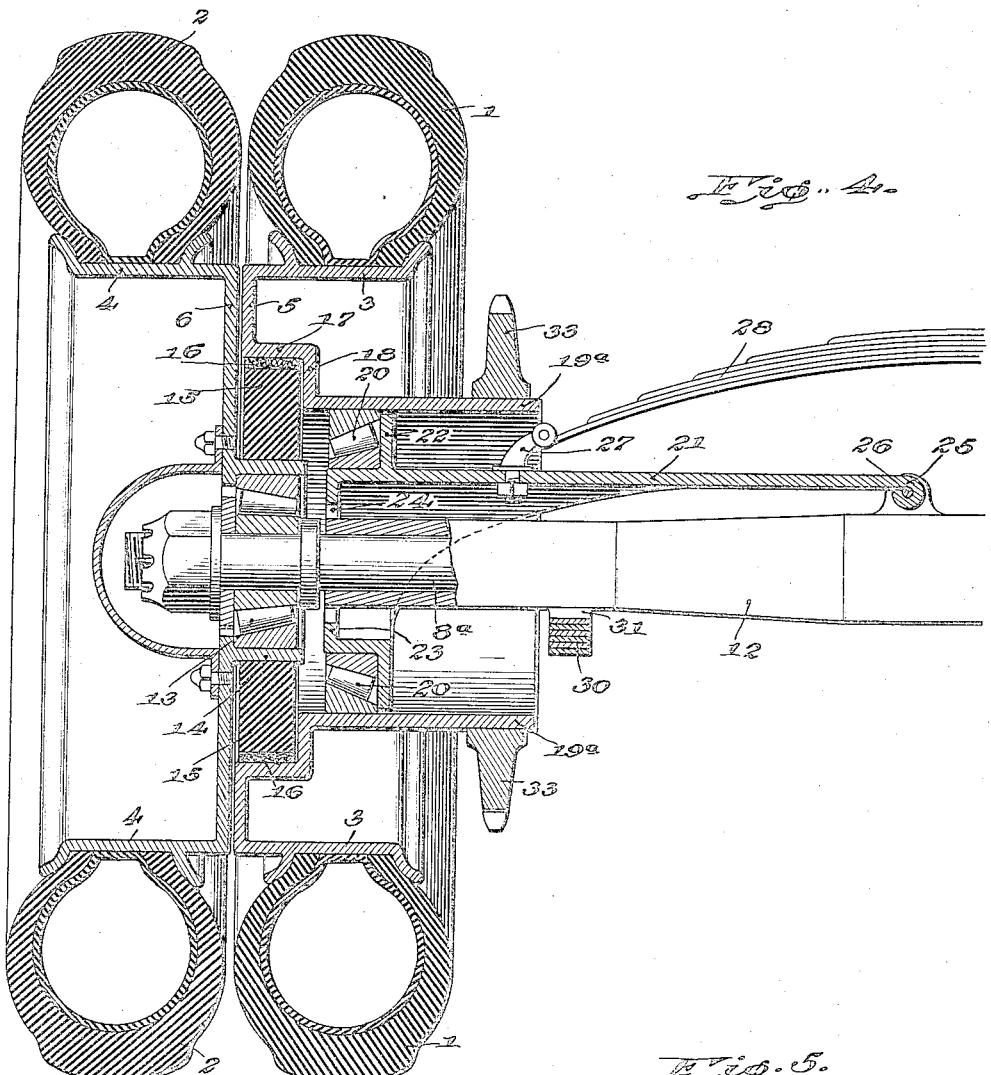
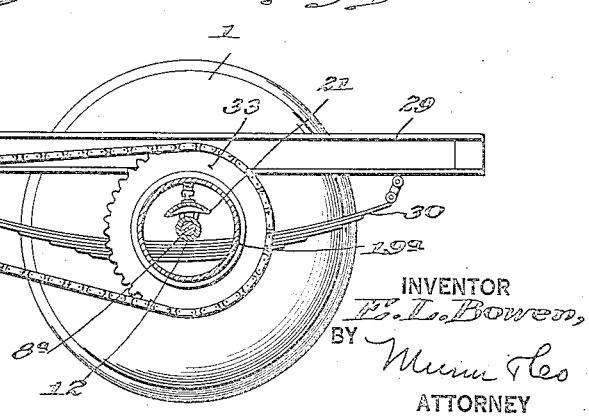

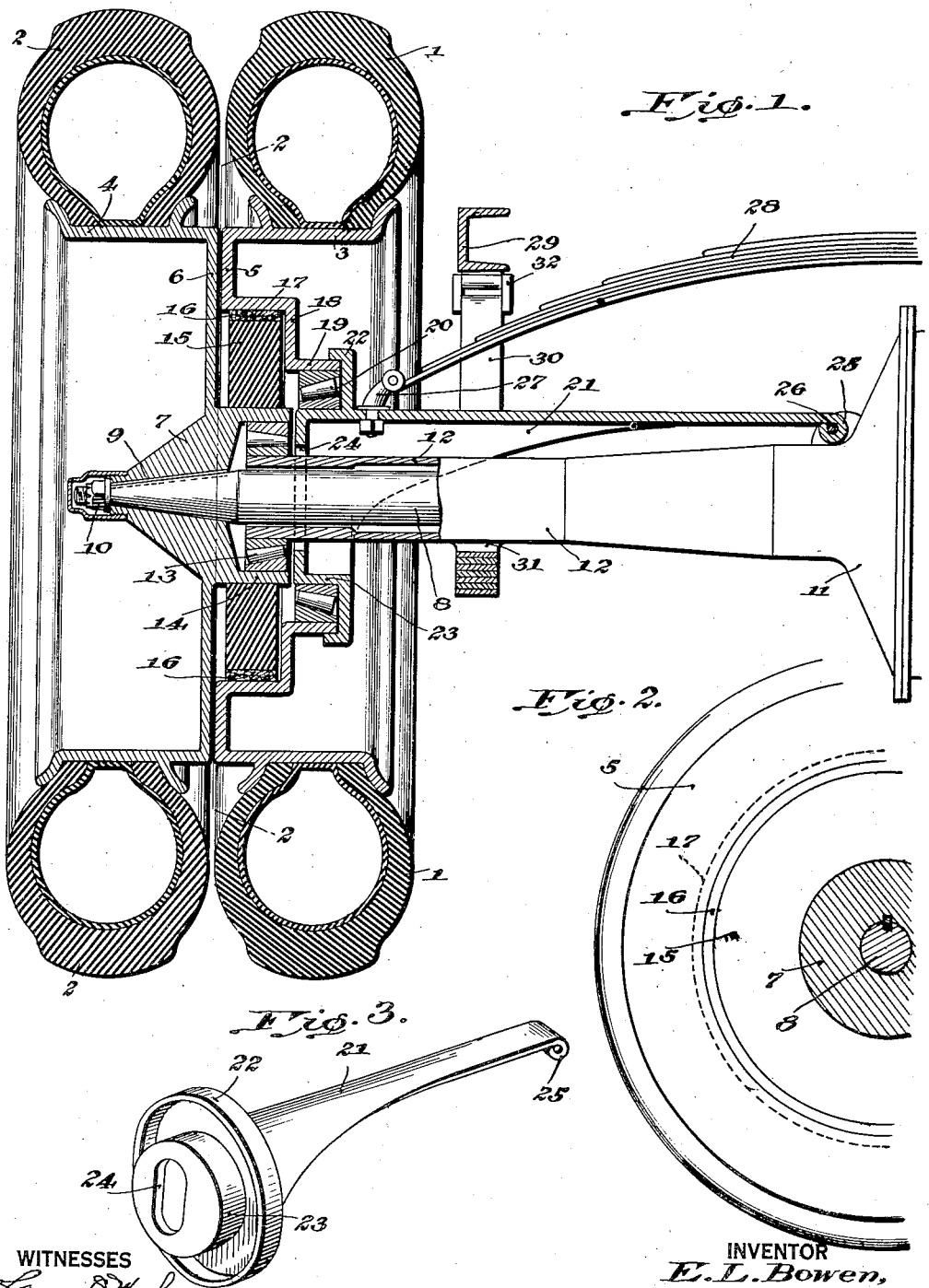

Patented June 26, 1934

1,964,105

UNITED STATES PATENT OFFICE 1,964,105

LOAD EQUALIZING MEANS FOR DUAL-TIRED WHEELS

Everette L. Bowen, Barstow, Md.

Application July 16, 1932, Serial No. 622,956

8 Claims. (Cl. 180—22)

This invention relates to improvements in automotive equipment, especially to dual-tired wheels, and its objects are as follows:—

First, to provide separate and relatively movable mounts for the tires of dual-tired wheels thus to enable each tire to ride the road with substantially equal traction regardless of the longitudinal and transverse contours of the road.

Second, to support each of said mounts by a separate spring, said springs being separately connected with the chassis and apportioning the immediately superimposed load to each of the tires so as to equalize the burden and prevent one tire from heating more than the other.

Third, to drive one of the tire mounts directly and the other indirectly, the means for accomplishing the indirect drive being of a yieldable nature, usually an elastic insert, so as to compensate for the foregoing relative movement of the mounts.

Fourth, to provide a dual spring support for the dual-tired wheels of automotive trucks thus insuring spring flexure under a wider load range, especially when the truck is lightly loaded.

Fifth, to guide the relative movement of the separate tire mounts in a direction perpendicular to the road, or substantially so.

Sixth, to embody the principles of relative movement of the separate tire mounts and of the independent spring suspensions thereof in dual-tired wheels whether of the drive or driven types.

Other objects and advantages will appear in the following specification, reference being had to the accompanying drawings in which Figure 1 is a vertical cross section of a dual-tired wheel wherein the driving power is administered to the mount of the outer tire.

Figure 2 is a detail sectional view taken substantially on the line 2—2 of Figure 1, omitting the inner tire and particularly illustrating the elastic insert, which in this case is a wheel, for indirectly driving the inner tire mount.

Figure 3 is a detail perspective view of the spring hanger in Figure 1.

Figure 4 is a central vertical section of a dual-tired wheel wherein the driving power is administered to the inner tire mount, the arrangement being a reversal of that in Figure 1.

Figure 5 is a detail sectional view of a portion of a chassis, particularly illustrating how the drive of the inner tire mount is derived from a jack shaft.

It will be understood from the foregoing brief statements that the chief purpose of the invention is to equalize the load on dual-tired wheels. Such wheels have come into use in comparatively recent times on automobile trucks from the smallest to the largest sizes. The prevailing practice is to rigidly bolt the tire mounts together so that the dual-tired wheels revolve as one.

When wheels of this type ride the crown of the road, or when they ride a road which for any reason has higher parts toward the longitudinal center of the truck so that the truck passes over a road surface which generally slants downwardly on each side, the greatest load is imposed on the inner tires, and the outer tires of the dual-tired wheels bear a small percentage of the load.

It has been estimated in actual practice and from actual observation that under conditions such as named above, the inner tires will assume as much as 75% over-load. The effect is not noticeable in new tires and in tires which are substantially new, until a variation in the wear of the treads becomes observable. After the tires have become worn and weakened from service, an over-load such as stated above, will and has caused one or both of the inner tires to blow out, thus necessitating a lightening of the load to a point within the capacity of the remaining good outer tires.

The problem of preventing over-taxation of the inner tires is herein dealt with by making the tire mounts separate and relatively movable with respect to each other so that each of the tires of the wheels may bear down on the road alike. Attention is first directed to Figure 1 which is to be regarded as a fractional cross section of any known type of dual-tired drive wheel truck. The inner and outer tires 1, 2 are attached in any of the variously known ways to inner and outer rims 3, 4, herein designated the inner and outer mounts. Generally speaking, the tire 1 and its rim 3, and the tire 2 and its rim 4 comprise a pair of rotary members and collectively constitute a wheel. Instead of these mounts being bolted together, they remain separate and are movable relatively to each other, the adjoining webs 5, 6 having a very small space between them so that the possibility of friction and consequent wear will be avoided.

In practice it may be deemed advisable to load the space between the webs 5, 6 with grease, but no means for greasing the adjacent surfaces of the webs is disclosed herein because the mode of lubrication has no bearing on the invention. Nor has the means for excluding dirt and other foreign matter from the space between the webs. In practice suitable interlocking connections will be adopted or such other device as will keep the dirt out and prevent clogging.

Tracing the outer mount 4 to its source of driving power, the web 6 includes a central hub 7 which has a tapered opening for the reception of the tapered spindle of the drive shaft 8. The hub 7 is keyed in place as at 9 and secured by means of a nut 10 which is screwed onto the threaded end of the spindle as in common practice. The shaft 8 is driven by differential mechanism (not shown) in a housing 11.

This housing has the axle housing 12 connected with it at one end. The axle housing 12 like the housing 11 is stationary. The free end of the axle housing 12 carries a roller bearing 13. This bearing supports the hub 7 of the outer mount 4, said hub including an inward extension 14 partly for the purpose of receiving the bearing.

It will thus be seen that the drive shaft 8 drives the outer mount 4 directly, but the driving effort is also imparted to the inner mount 3, although indirectly, by means of an insert 15 which is fixed on the extension 14 at its central portion, and has tight frictional engagement at its peripheral portion with a lining 16 inside of a drum 17 projecting inwardly from the web 5.

The mode of affixing the insert 15 to the extension 14 may be by vulcanization because the insert will usually comprise a wheel of rubber or similar elastic material. The purpose in adopting an elastic insert is to provide a yieldable connection between the mounts 3 and 4, the necessity for yielding being brought about by the permissible relative movement of the mounts. It is thus apparent that the rubber wheel also acts as a shock absorber, supplementing the springs, later described. The lining 16 may comprise brake lining of an appropriate type. The frictional engagement of the periphery of the insert 15 will be tight so that there will not be any slippage between the insert wheel and the lining 16.

With this end in view it would be permissible to permanently fasten the periphery of the insert 15 directly to the inside of the drum 17. However, the use of the lining 16 as adopted in the present case is to make apparent a conventional mode of assemblage of the mounts 3 and 4. In other words, the mounts 3, 4 are assembled by driving the insert 15 into the previously applied lining 16. The actual mode of applying the insert 15 is not so material, the main thing to be observed is its yieldable quality which makes the insert a yieldable coupling between the coacting relatively movable mounts.

An inner wall 18 connects the drum 17 with a sleeve 19 which bears on a roller bearing 20 which is carried by a spring hanger 21. This hanger has a circular flanged wall 22 which fits the sleeve 19 in such a way as to partly encase the bearing 20 and to exclude foreign matter. The wall 22 practically bounds the inner limit of a drum 23 by which the roller bearing 20 is supported. This drum is slotted at 24 to accommodate the axle housing 12. The slot 24 is necessary to permit the relative movement of the tire mounts, it being obvious that the slot will come into play when either tire moves perpendicularly with respect to the other.

The hanger 21 has the shape of a long arm which is formed in such a way as to give it a high degree of strength. The inner end of the arm is curled over at 25 into the form of an eye to make a hinge connection at 26 with an appropriate bracket on the differential housing 11. The hanger 21 swings on its hinge connection, but inasmuch as it has a long radius, the fact of the movement at the free end being arcuate will be imperceptible, and in practice will have no effect on the mount 3 or its appurtenances.

The designation of the element 21 as a spring hanger comes from the fact that it carries a shackle 27 to which one end of a semi-elliptical spring 28 is connected. The medial portion of this spring is fixed to the chassis of the vehicle, of which chassis the channel iron 29 is to be regarded as a part. Another spring 30, of approximately the same tension as the spring 28, is attached to a saddle 31 beneath the axle housing 12 as shown or above it, and is connected at 32 with the chassis.

These springs constitute separate suspension means and are disposed at angles to each other. The present showing is that of a right angular disposition. The spring 28 conveys the immediately superimposed portion of the load to the inner tire, while the spring 30 conveys its immediately superimposed portion of the load to the outer tire 2. The purpose of the separate springs and their separate connections with the chassis is to distribute the load between the two tires 1, 2, in other words to equalize the burden regardless of the relative position in which one tire will be running with respect to the other. It is this equalization of the burden which prevents one tire from heating more than the other.

The use of the separate springs 28, 30 imparts far greater flexibility, so to speak, to the chassis than if the customarily single, heavy spring construction were employed. One might say that the customary heavy spring is divided into two springs. The supporting effect of the heavy spring will be retained, but the added flexibility of two light springs will be added. The customary heavy spring will flex only under a heavy load, the two relatively light springs 28, 30 will flex under relatively light loads so that the riding of the vehicle under light loads will not be stiff and uncomfortable.

Attention is next directed to Figure 4. Every principle of the arrangement in Figure 1 is duplicated, the only exception being that in Figure 4 the inner tire mount is driven and the outer tire mount is indirectly driven whereas in Figure 1 the reverse is the case. Inasmuch as the majority of the parts are alike, corresponding reference numerals are used in Figure 4, and only changes in the construction are now described:—

The axle 8ª is now a dead axle. It takes the place of the axle housing 12 in Figure 1. The sleeve 19ª is made long enough to extend well beyond the inner side of the tire 1 and make room for a large sprocket 33. This sprocket is keyed or otherwise affixed to the sleeve 19ª. It is driven by a chain 34 (Fig. 5) which is applied to a sprocket 35 of a jack shaft 36.

In practice the inner mount 3 will be equipped with a brake drum and brake mechanism according to practice. These parts are purposely omitted to avoid any confusion with the relative movement of the two tire mounts. It must here be understood that the principle of respective movement between dual-tire mounts is not confined to drive wheels. It is conceivable that very heavy trucks will use dual-tired front wheels. In fact some heavy vehicles use pairs of dual-tired wheels on each side at the rear.

The idea of relative movement of dual mounts is as effective in "dead" wheels as it is in "live" wheels. Wherever dual-tired wheels are used it will be a consideration to equalize the load on the two tires so as to prevent unequal wear and heating as already brought out.

The operation is readily understood. A brief résumé of the operation with respect to Figure 1 will serve for all instances. The superimposed portions of the load will be imposed on the inner and outer tires 1, 2 with substantially equal effect through the springs 28, 30. Suppose that the wheel should ride a severely crowned road. Instead of the tire 2 easing up on its contact with the surface, as it would do if the mounts 3, 4 were bolted together, the downward pressure through the spring 30 would cause the tire 2 to sink, so to speak, until it arrived at the same tractive effect as the tire 1.

This effect presupposes the relative movement of the mounts 3, 4 upon which emphasis is herein laid. Relative movement is made possible by the slot 24 and by the elasticity of the rubber wheel 15. There will be a buckling of its nether parts and a stretching of its upper parts, yet the driving contact of its periphery with the lining 16 will remain so firm as not to impede the driving effect of the inner mount 3. Regardless of what the longitudinal and transverse contours of the road may be, the tires 1 and 2 will yield up and down by virtue of the capability of relative movement of their mounts 3 and 4. The relative movements are guided by the slot 24, and generally speaking, the relative movements are perpendicular to the road.

Earlier in this description the statement is made that the insert 15 is of a yieldable nature, the use of rubber being cited as a common example of its construction. Inasmuch as the insert 15 is depended upon for its shock absorbing quality as well as the indirect drive for one of the rotatable members, its yieldable nature is to be regarded in a broad sense because it is contemplated to use a pneumatic tire in lieu of the solid rubber insert in some instances with the following important result:

By employing a pneumatic tire, or a pneumatic annulus which will answer the description of a tire, it becomes possible to vary its pressure against the lining 16 or against the insert of the drum 17 should it be found preferable to eliminate the lining. When the factor of traction is discovered as diminishing between the insert 15 and drum 17 the pneumatic tire can simply be pumped up so as to bring its peripheral contact up to a normal degree. For general purposes the rubber insert will be entirely satisfactory, although if its tractive effect becomes diminished by reason of eventual wear it will become necessary to replace the lining 16.

I claim:—

1. Load equalizing means for dual-tired wheels comprising a pair of tires, separate mounts for said tires, one of the mounts being a driver, separate means for imposing a load on the respective mounts, said means so connecting the mounts as to enable independent perpendicular movement relatively to each other, and an elastic insert between said mounts constituting a driving connector from said one mount to the other mount.

2. In a wheel having plural tires, an independent mount for each tire, the mounts being independently movable enabling relative movement so that each tire may contact the road with equal traction, and separate suspension means for said mounts, imposing the components of a load on the wheel and dividing the load between the tires.

3. Load equalizing means for dual-tired wheels comprising a pair of rotary members, separate suspension means making connection with the respective members and enabling movement of one member relatively to the other, means for directly driving one of the members, and means interposed between the members for indirectly driving the remaining member.

4. Load equalizing means for dual-tired wheels comprising a pair of rotary members, separate suspension means making connection with the respective members and enabling movement of one member relatively to the other, means for directly driving one of the members, and yieldable means interposed between the members and in tight contact therewith for indirectly driving the remaining member.

5. Load equalizing means for dual-tired wheels comprising a pair of rotary members, separate suspension means making connection with the respective members and enabling movement of one member relatively to the other, means for directly driving one of the members, and an elastic insert interposed between the members and in tight contact therewith for indirectly driving the remaining member.

6. Load equalizing means for dual-tired wheels comprising a pair of rotary members, separate suspension means making connection with the respective members and enabling movement of one member relatively to the other, means for directly driving one of the members, and an elastic insert interposed between the members and in tight contact therewith for indirectly driving the remaining member, said insert consisting of a rubber wheel.

7. In load equalizing means, a pair of rotary members constituting a wheel, an axial structure for the support of one of the members, a movable hanger for the remaining member, means by which the hanger is movably carried enabling movement of the respective member relatively to the first member, and individual resilient suspension means for the axial structure and hanger.

8. In load equalizing means, a pair of rotary members constituting a wheel, an axial structure for the support of one of the members, a movable hanger for the remaining member, means by which the hanger is movably carried enabling movement of the respective member relatively to the first member, individual resilient suspension means for the axial structure and hanger, and an elastic coupling between said members serving as a shock absorber.

EVERETTE L. BOWEN.